(12) United States Patent
Caples

(10) Patent No.: US 11,577,649 B2
(45) Date of Patent: Feb. 14, 2023

(54) ACTIVE OUTSIDE REAR VIEW DEVICE ENCLOSURE

(71) Applicant: GM Global Technology Operations LLC, Detroit, MI (US)

(72) Inventor: David C. Caples, Huntington Woods, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 340 days.

(21) Appl. No.: 17/002,323

(22) Filed: Aug. 25, 2020

(65) Prior Publication Data

US 2022/0063501 A1    Mar. 3, 2022

(51) Int. Cl.
| | | |
|---|---|---|
| B60R 1/07 | (2006.01) | |
| B62D 37/02 | (2006.01) | |
| B60R 1/062 | (2006.01) | |
| B60R 1/12 | (2006.01) | |

(52) U.S. Cl.
CPC .............. B60R 1/07 (2013.01); B60R 1/0625 (2013.01); B60R 1/12 (2013.01); B62D 37/02 (2013.01); *B60R 2001/1223* (2013.01); *B60R 2001/1253* (2013.01)

(58) Field of Classification Search
CPC .......... B60R 1/07; B60R 1/0625; B60R 1/12; B60R 2001/1223; B60R 2001/1253; B60R 1/06; B62D 37/02; B62D 35/005; Y02T 10/82
See application file for complete search history.

(56) References Cited

U.S. PATENT DOCUMENTS

| | | | | |
|---|---|---|---|---|
| 4,311,362 A | * | 1/1982 | LaPorte | .................... B60R 1/06 359/864 |
| 2013/0148219 A1 | * | 6/2013 | Oswald | .................. G02B 7/182 359/871 |
| 2014/0118855 A1 | * | 5/2014 | Whinnery | ................ B62J 29/00 359/842 |
| 2015/0002952 A1 | * | 1/2015 | Castillo | ................. B60R 1/0617 359/841 |

* cited by examiner

*Primary Examiner* — Sath V Perungavoor
*Assistant Examiner* — Tyler B Edwards
(74) *Attorney, Agent, or Firm* — Vivacqua Crane PLLC

(57) ABSTRACT

An active outside rear view system for a vehicle includes a support structure mounted to an exterior surface of the vehicle. A rear view device is movably affixed to the support structure. A linkage extends from a first end to a second end, where the first end of the linkage is movably affixed to an aerodynamic enclosure and the second end of the linkage is movably affixed to the support structure. An actuator is engaged with the linkage and moves the aerodynamic enclosure between at least a first position and a second position different from the first position. The aerodynamic enclosure is independently movable relative to the rear view device and the support structure. The aerodynamic first position and the second position provide differing aerodynamic characteristics to the active outside rear view system.

17 Claims, 4 Drawing Sheets

ACTIVE OUTSIDE REAR VIEW DEVICE ENCLOSURE

INTRODUCTION

The present disclosure generally relates to vehicles, and more specifically to rear-view devices mounted to motor vehicle exteriors. Outside rear view mirrors (OSRVMs) are mounted to exterior surfaces of motor vehicles and provide a motor vehicle driver with rearward-facing views of areas to the sides and behind the motor vehicle to which the OSRVMs are attached. Current OSRVMs are often enclosed in a stylized housing or enclosure that is rigidly mounted relative to the vehicle and designed to operate in a single state. The housings or enclosure protrude into airflow around the motor vehicle and can have an impact on wind noise, aerodynamic drag, and the like. Accordingly, OSRVM housings are typically shaped to achieve a specific aesthetic design and aerodynamic characteristics, such as increased downforce. However, each aerodynamic criterion selected for a typical single state OSRVM housing may increase certain undesirable characteristics, such as increased wind noise, aerodynamic drag, lift, reduced fuel economy, reduced mirror stability (increased vibration), or the like.

Thus, while current OSRVM housings and enclosures achieve their intended purpose, there is a need in the art for new and improved OSRVM housing systems and methods that can enable multiple operational states while driving without impacting the performance and visibility of the optics of the mirror, sensor, camera, or the like within the OSRVM housing or enclosure itself.

SUMMARY

In an aspect of the present disclosure an active outside rear view system for a vehicle includes a support structure mounted to an exterior surface of the vehicle. A rear view device is movably affixed to the support structure. A linkage extends from a first end to a second end. The first end of the linkage is movably affixed to an aerodynamic enclosure and the second end of the linkage is movably affixed to the support structure. An actuator is engaged with the linkage and moves the aerodynamic enclosure between at least a first position and a second position different from the first position. The aerodynamic enclosure is independently movable relative to the rear view device and the support structure. Aerodynamic characteristics of the active outside rear view system are different in each of the first and second positions of the aerodynamic enclosure.

In another aspect of the present disclosure the active outside rear view system further includes a control module. The control module is in communication with the actuator and selectively moves the aerodynamic enclosure between the at least first and second positions.

In still another aspect of the present disclosure the control module further includes a processor, a memory, and one or more input/output ports. The memory stores programmatic control logic. The input/output ports receive data from the actuator and pass the data to the processor. The processor takes the data as an input and executes the programmatic control logic. The processor passes actuator positioning commands to the input/output ports, and the input/output ports transmit the actuator positioning commands to the actuator.

In yet another aspect of the present disclosure the programmatic control logic further includes a first programmatic control logic engaging a first mode of the active outside rear view system, and a second programmatic control logic engaging a second mode of the active outside rear view system. The first mode is a passive mode, where the control module receives a command from a vehicle operator, the command setting a desired position for the aerodynamic enclosure, and the control module transmits a passive positioning command to the actuator to achieve the desired position. The second mode is an active mode. In the second mode, the control module continuously monitors vehicle state parameters by continuously receiving data via the input/output ports, from vehicle state sensors comprising: speed sensors, vehicle yaw rate sensors, vehicle acceleration rate sensors, steering wheel angle sensors, throttle position sensors, accelerator pedal position sensors, brake pedal position sensors, and drive mode selection status data. The control module takes the data as input to a second programmatic control logic that, when executed by the processor, continuously transmits active positioning commands to the actuator to continuously and automatically adjust the position of the aerodynamic enclosure.

In still another aspect of the present disclosure in the first position, the aerodynamic enclosure is positioned to generate a predetermined minimum quantity of aerodynamic drag, and in the second position, the aerodynamic enclosure is positioned to generate a predetermined maximum quantity of aerodynamic downforce.

In yet another aspect of the present disclosure the actuator is one or more of an electromechanical device, a hydraulic device, a pneumatic device, an aero-elastic device, and a shape-memory device. The linkage is one or more of a ball and socket, a scissor linkage, a four bar linkage, a two bar linkage, a crank and slider linkage, a crank and piston, a rack and pinion, a recirculating ball system, and a pneumatic or hydraulic piston.

In yet another aspect of the present disclosure the actuator engages with the linkage to tilt a frontward-facing portion of the aerodynamic enclosure about a horizontal axis extending substantially laterally outward from the exterior surface of the vehicle so that the frontward-facing portion of the aerodynamic enclosure moves vertically between the first position and the second position.

In still another aspect of the present disclosure the actuator engages with the linkage to rotate a frontward-facing portion of the aerodynamic enclosure about a vertical axis so that the frontward-facing portion of the aerodynamic enclosure moves in a substantially horizontal plane between the first position and the second position.

In yet another aspect of the present disclosure the actuator engages with the linkage to move a frontward-facing portion of the aerodynamic enclosure along a horizontal axis extending substantially laterally outward from the exterior surface of the vehicle so that the frontward-facing portion of the aerodynamic enclosure moves laterally between the first position proximate the exterior surface of the vehicle and the second position distal to the exterior surface of the vehicle.

In still another aspect of the present disclosure the rear view device includes one or more of a sensor, a camera, and an optical mirror.

In yet another aspect of the present disclosure a method for adjusting a position of an active outside rear view system includes utilizing a control module to adjust the position of the active outside rear view system. The method further includes storing programmatic control logic within a memory of the control module. The method further includes receiving, by input/output ports of the control module, a mode selection input, the mode selection input engaging a first programmatic control logic, or a second programmatic control logic, the first programmatic control logic engaging a first mode of the active outside rear view system, and the second programmatic control logic engaging a second mode of the active outside rear view system. The method further includes receiving, by the input/output ports of the control module, data transmitted from an actuator of the active outside rear view system in communication with the input/output ports. The active outside rear view system further including a support structure mounted to an exterior surface of the vehicle, a rear view device movably affixed to the support structure, the rear view device including one or more of a sensor, a camera, and an optical mirror, an aerodynamic enclosure, and a linkage extending from a first end to a second end. The first end of the linkage is movably affixed to the aerodynamic enclosure and the second end of the linkage is movably affixed to the support structure. An actuator is engaged with the linkage and moves the aerodynamic enclosure between at least a first position and a second position different from the first position. The aerodynamic enclosure is independently movable relative to the rear view device and the support structure. The method further includes passing the data from the input/output ports to a processor of the control module, the processor receiving the data as input. The processor executes the programmatic control logic to generate actuator positioning commands as output. The actuator positioning commands are passed to the input/output ports which transmit the actuator positioning commands to the actuator. The method further includes selectively adjusting the aerodynamic enclosure between at least the first position and the second position based on the actuator positioning commands, wherein aerodynamic characteristics of the active outside rear view system are different in each of the first and second positions of the aerodynamic enclosure.

In still another aspect of the present disclosure the method further includes selectively executing the first programmatic control logic to engage the first mode of the active outside rear view system. The first programmatic control logic further includes receiving, by the control module, a command from a vehicle operator and setting, by the control module, a desired position for the aerodynamic enclosure based on the command from the vehicle operator. A passive positioning command is transmitted from the control module to the actuator via the input/output ports to achieve the desired position.

In yet another aspect of the present disclosure, the method further includes selectively executing the second programmatic control logic to engage the second mode of the active outside rear view system. The second programmatic control logic includes continuously monitoring vehicle state parameters by continuously receiving vehicle state data via the input/output ports, from vehicle state sensors comprising: speed sensors, vehicle yaw rate sensors, vehicle acceleration rate sensors, steering wheel angle sensors, throttle position sensors, accelerator pedal position sensors, brake pedal position sensors, and drive mode selection status data. The method further includes taking the vehicle state data as input and in response to the input, continuously transmitting, by the control module via the input/output ports, active positioning commands to the actuator to continuously and automatically adjust a position of the aerodynamic enclosure.

In still another aspect of the present disclosure the method further includes positioning the aerodynamic enclosure to generate a predetermined minimum quantity of aerodynamic drag in the first position and positioning the aerodynamic enclosure to generate a predetermined maximum quantity of aerodynamic downforce in the second position.

In yet another aspect of the present disclosure selectively adjusting the aerodynamic enclosure between at least the first position and the second position further includes commanding the actuator to move between at least the first position and the second position. The actuator includes one or more of an electromechanical device, a hydraulic device, a pneumatic device, an aero-elastic device, and a shape-memory device. The linkage includes one or more of a ball and socket, a scissor linkage, a four bar linkage, a two bar linkage, a crank and slider linkage, a crank and piston, a rack and pinion, a recirculating ball system, and a pneumatic or hydraulic piston.

In still another aspect of the present disclosure the method further includes moving, with the actuator via the linkage, a frontward-facing portion of the aerodynamic enclosure about a horizontal axis extending substantially laterally outward from the exterior surface of the vehicle so that the frontward-facing portion of the aerodynamic enclosure moves vertically between the first position and the second position.

In yet another aspect of the present disclosure the method further includes moving, with the actuator via the linkage, a frontward-facing portion of the aerodynamic enclosure about a vertical axis so that the frontward-facing portion of the aerodynamic enclosure rotates in a substantially horizontal plane between the first position and the second position.

In still another aspect of the present disclosure the method further includes moving, with the actuator via the linkage, a frontward-facing portion of the aerodynamic enclosure along a horizontal axis extending substantially laterally outward from the exterior surface of the vehicle so that the frontward-facing portion of the aerodynamic enclosure slides laterally between the first position proximate the exterior surface of the vehicle and the second position distal to the exterior surface of the vehicle.

In yet another aspect of the present disclosure an active outside rear view system for a vehicle includes a support structure mounted to an exterior surface of the vehicle. A rear view sensor, camera, or optical mirror is movably affixed to the support structure. A linkage extending from a first end to a second end. The first end of the linkage is movably affixed to an aerodynamic enclosure and the second end of the linkage is movably affixed to the support structure opposite the rear view sensor, camera, or optical mirror. The aerodynamic enclosure being forward or frontward-facing. An actuator is engaged with the linkage and moves the aerodynamic enclosure between at least a first position and a second position different from the first position. The actuator is one or more of an electromechanical device, a hydraulic device, a pneumatic device, an aero-elastic device, and a shape-memory device. In the first position, the aerodynamic enclosure is positioned to generate a predetermined minimum quantity of aerodynamic drag, and in the second position the aerodynamic enclosure is positioned to generate a predetermined maximum quantity of aerodynamic downforce. The aerodynamic enclosure is independently movable relative to the rear view device and the support structure. The actuator is operable in at least two modes including: a passive mode and an active mode. In the passive mode the active rear view device receives a command from a vehicle operator, the command setting a desired position for the aerodynamic enclosure, and the actuator positioning the aerodynamic enclosure in the desired position. In the active mode the active rear view device continuously monitors vehicle state parameters from vehicle state sensors comprising: speed sensors, vehicle yaw rate sensors, vehicle acceleration rate sensors, steering wheel angle sensors, throttle position sensors, accelerator pedal position sensors, brake pedal position sensors, and drive mode selection status data. The active rear view device continuously, automatically, and actively moves the actuator to continuously, automatically, and actively adjust the position of the aerodynamic enclosure. The aerodynamic characteristics of the active outside rear view system are different in each of the first and second positions of the aerodynamic enclosure.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
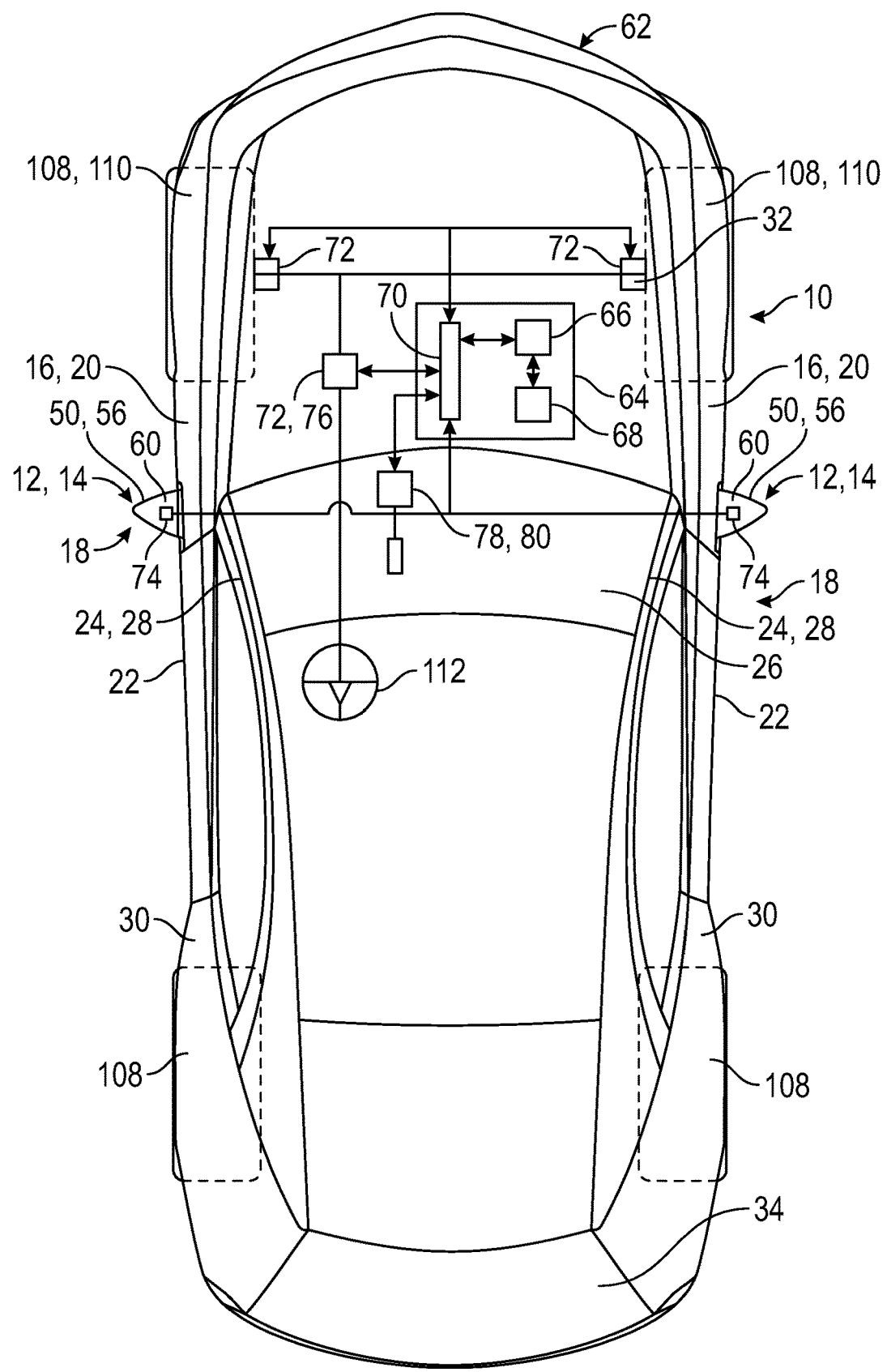
FIG. 1 is a schematic view of a vehicle equipped with an active outside rear view device and system according to an exemplary embodiment.

The following description is merely exemplary in nature and is not intended to limit the present disclosure, application, or uses.

Referring now to the drawings, wherein like reference numbers correspond to like or similar components throughout the several figures, the terms "forward", "rear", "inner", "inwardly", "outer", "outwardly", "above", and "below" are terms used relative to the orientation of a vehicle 10 as shown in the drawings of the present application. Thus, "forward" refers to a direction toward a front of a vehicle 10, "rearward" refers to a direction toward a rear of a vehicle 10, "inner" and "inwardly" refers to a direction towards the interior of a vehicle 10, and "outer" and "outwardly" refers to a direction towards the exterior of a vehicle 10, "below" refers to a direction towards the bottom of the vehicle 10, and "above" refers to a direction towards a top of the vehicle 10.

Additionally, in the claims and specification, certain elements are designated as "first", "second", "third", "fourth", "fifth", "sixth", and "seventh". These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

The vehicle 10 shown in FIG. 1 is shown schematically, and is equipped with an active outside rear view system 12. While the vehicle 10 is illustrated as a car, it should be appreciated that the vehicle 10 may be any type of vehicle 10 including a car, van, truck, motor home, semi, boat, jet ski or other watercraft, snowmobile, motorcycle, scooter, bicycle, aircraft, or the like. The active outside rear view system 12 of the vehicle 10 generally includes a rear view device 14. The rear view device 14 provides a vehicle operator with a rearward-facing view of a predetermined area alongside and behind the vehicle 10. In some examples, the rear view device 14 is an optical sensor, a radar sensor, a sonar sensor or the like, a camera, and/or an optical mirror. In order to provide such a view, the rear view device 14 is disposed on an exterior surface 16 of the vehicle 10, and more specifically on at least one side 18 of the vehicle 10. The rear view device 14 may be mounted to a front fender 20, a door 22, a pillar 24, a hinge (not specifically shown), a windshield 26 or windshield surround 28, a rear fender 30, a bonnet or hood 32, a trunk 34, or the like without departing from the scope or intent of the present disclosure.

Figure 2A:
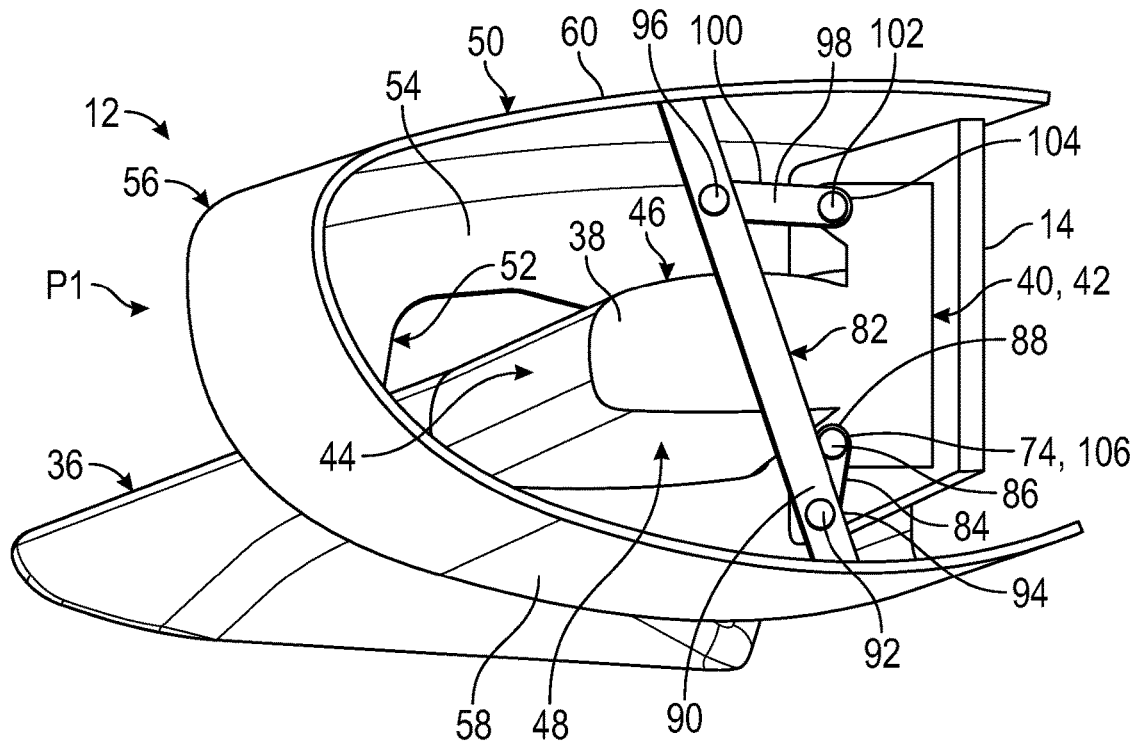
FIG. 2A is a partial perspective cross-sectional side view of an active outside rear view device and system in a first position according to an exemplary embodiment.
Figure 2B:
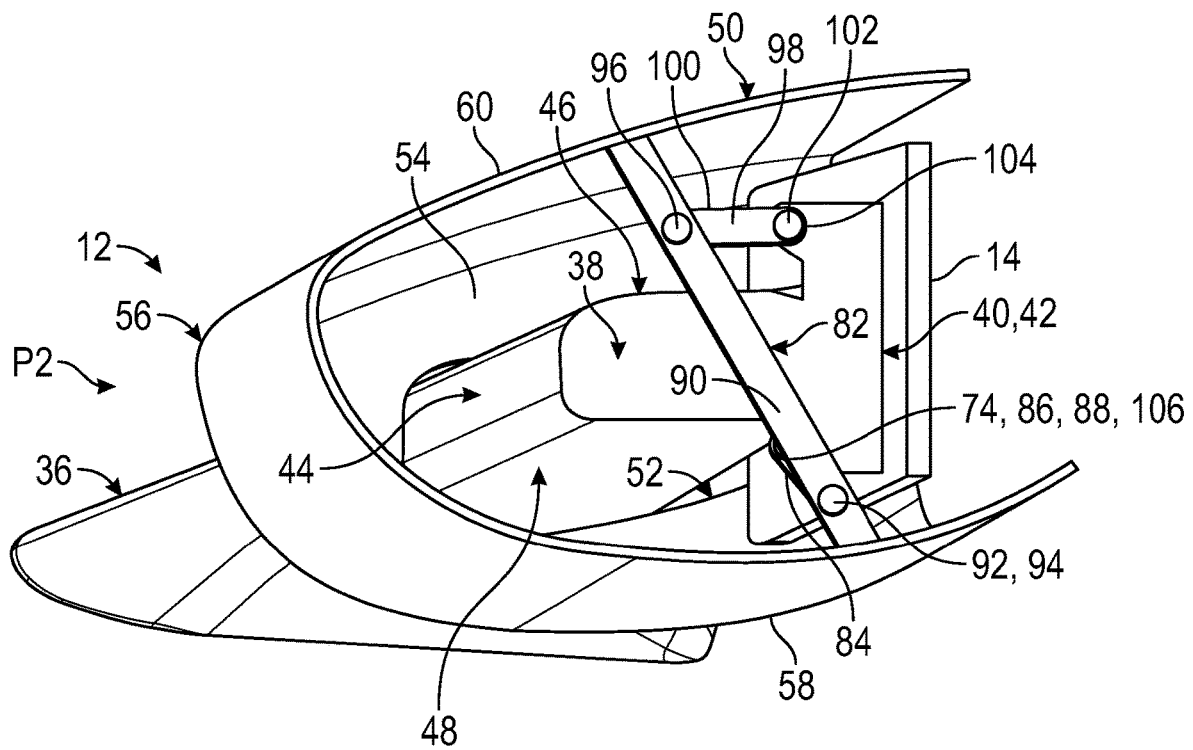
FIG. 2B is a partial perspective cross-sectional side view of an active outside rear view device and system in a second position according to an exemplary embodiment.
Figure 3A:
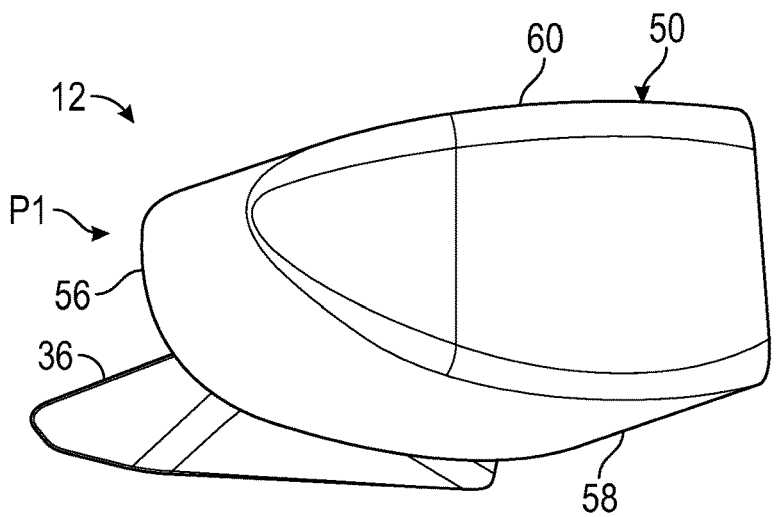
FIG. 3A is a partial perspective side view of an active outside rear view device and system in the first position according to an exemplary embodiment.
Figure 3B:
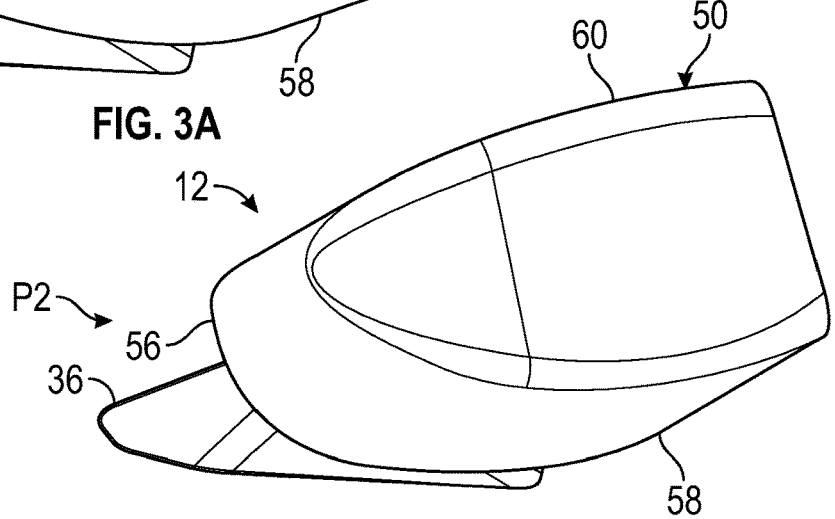
FIG. 3B is a partial perspective side view of an active outside rear view device and system in the second position according to an exemplary embodiment.
Figure 4A:
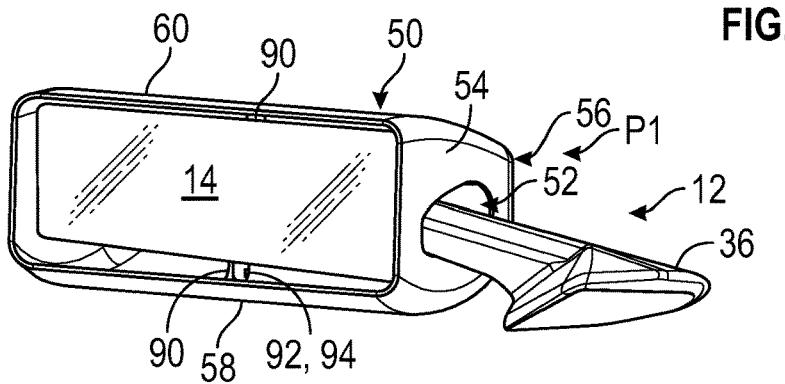
FIG. 4A is a partial perspective rear view of an active outside rear view device and system in the first position according to an exemplary embodiment.
Figure 4B:
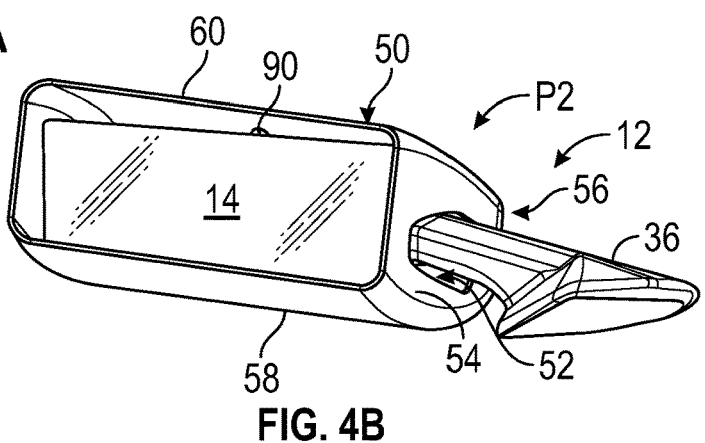
FIG. 4B is a partial perspective rear view of an active outside rear view device and system in the second position according to an exemplary embodiment.

Turning now to FIGS. 2A-2B, 3A-3B, and 4A-4B, and with continuing reference to FIG. 1, the active outside rear view system 12 and rear view device 14 are shown in further detail. FIGS. 2A-2B depict a partial cross-sectional side view of the active outside rear view system 12, while FIGS. 3A-3B depict a partial side-view of the active outside rear view system 12 and FIGS. 4A-4B depict a partial perspective exterior rear view of the active outside rear view system 12. The rear view device 14 is supported by a support structure 36 which extends from the exterior surface 16 of the vehicle 10 to a terminus 38 distal to the exterior surface 16 of the vehicle 10. The rear view device 14 is generally movably attached to a rearward-facing portion 40 of the terminus 38 of the support structure 36 by an articulating mount 42. The articulating mount 42 may be any of a wide variety of known manual and/or motorized mounting means for rear view devices 12, such as gimbles, ball mounts, multi-bar linkages, or the like. The rear view device 14 is movable relative to the support structure 36 so that the rear view device 14 may be angled to provide a vehicle operator with a view of a desired portion of the area adjacent to and/or behind the vehicle 10. It should be appreciated that depending on the particular shape of the rear view device 14, the articulating mount 42 may be disposed on or affixed to different aspects of the support structure 36, such a as a forward-facing portion 44, an upward-facing portion 46, a downward-facing portion 48, or indeed to the terminus 38 of the support structure 36 itself. In still further examples, the rear view device 14 may be mounted directly to the exterior surface 16 of the vehicle 10.

An aerodynamic enclosure 50 at least partially encloses and is supported by the support structure 36. In an example, the support structure 36 extends outward from the exterior surface 16 of the vehicle 10 and passes through an aperture 52 in an inward-facing portion 54 of the aerodynamic enclosure 50. In some examples, the aperture 52 is at least partially enclosed by a water-resistant gasket, a sliding bezel, a seal, or the like (not specifically shown). It should be appreciated, however, that the support structure 36 may support extend through a forward or frontward-facing portion 56, a bottom portion 58, a top portion 60, or any other portion of the aerodynamic enclosure 50 without departing from the scope or intent of the present disclosure.

The aerodynamic enclosure 50 also at least partially encloses the rear view device 14. More specifically, the aerodynamic enclosure 50 faces forward, relative to the vehicle 10, so that as the vehicle 10 moves forward, air incident on a front 62 of the vehicle 10 is also incident on at least the frontward-facing portion 56 of the aerodynamic enclosure 50. The aerodynamic enclosure 50 directs air around the rear view device 14 and at least part of the support structure 36. In some aspects, the aerodynamic enclosure 50 further functions to direct air into air inlets or intakes (not specifically shown) to feed air into an internal combustion engine (ICE) (not specifically shown), a radiator (not specifically shown), a brake duct (not specifically shown), or over other aerodynamic addenda disposed on the exterior surface 16 of the vehicle 10.

A control module 64 disposed in the vehicle 10 is in communication and selectively and actively alters a position of the active outside rear view system 12 between at least a first position P1 and a second position P2. In several aspects, the first position P1 is optimized for maximum aerodynamic efficiency. That is, when the active outside rear view system 12, and more specifically, the aerodynamic enclosure 50, is in the first position P1, a drag coefficient of the active outside rear view system 12 and aerodynamic enclosure 50 are at a minimum. The maximum aerodynamic efficiency of the first position P1 offers numerous advantages, including, but not limited to reducing vehicle fuel and/or electricity consumption of the vehicle 10, reducing or substantially eliminating wind-noise and other noise, vibration, and harshness (NVH) characteristics, and the like. By contrast, the second position P2 is optimized for maximum aerodynamic downforce. That is, when the active outside rear view system 12 and the aerodynamic enclosure 50 are in the second position P2, the system 12 and aerodynamic enclosure 50 produce a maximum quantity of aerodynamic downforce, or at least a minimum quantity of aerodynamic lift. In several aspects, the second position P2 has a larger drag coefficient than the first position P1, and is therefore somewhat less aerodynamically efficient than the first position P1. However, the first position P1 also produces lower quantities of aerodynamic downforce than the second position P2. The high downforce characteristics of the second position P2 of the system 12 offers several advantages, including but not limited: to improving or augmenting mechanical grip during rapid vehicle acceleration/deceleration and cornering maneuvers, improving or augmenting airflow through cooling apparatuses of the vehicle 10, and the like.

The control module 64 is a non-generalized, electronic control device having a preprogrammed digital computer or processor 66, non-transitory computer readable medium or memory 68 used to store data such as control logic, software applications, instructions, computer code, data, lookup tables, etc., and input/output ports 70. computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium or memory 68 excludes wired, wireless, optical, or other communication links that transport transitory electrical or other signals. A non-transitory computer readable medium or memory 68 includes media where data can be permanently stored and media where data can be stored and later overwritten, such as a rewritable optical disc or an erasable memory device. Computer code includes any type of program code, including source code, object code, and executable code. The processor 66 is configured to execute the code or instructions. In a vehicle 10, the control module 64 may be a dedicated Wi-Fi controller or an engine control module, a transmission control module, a body control module, an infotainment control module, etc. The input/output ports 70 are configured to communicate in a wired, wireless, pneumatic, hydraulic, or similar fashion with sensors 72 and actuators 74 of the vehicle 10.

The sensors 72 and actuators 74 of the vehicle 10 may include a wide variety of electrical, pneumatic, hydraulic, mechanical and other such components which generate, receive, and transmit vehicle state information to the input/output ports 70 of the control module 64, and which also receive commands from the input/output ports 70 of the control module 64. In several examples, the vehicle state sensors 72 include: speed sensors, vehicle yaw rate sensors, vehicle acceleration rate sensors, steering wheel angle sensors 76, throttle position sensors 78, accelerator pedal position sensors 80, brake pedal position sensors, and drive mode selection status sensors, and the like. The sensors 72 transmit the vehicle state information to the input/output ports 70 of the control module 64, and the input/output ports 70 pass the vehicle state information to the processor 66. More specifically, the processor 66 executes at least programmatic control logic stored in the memory 68 using the vehicle state information or data as input to the programmatic control logic. Output from the programmatic control logic is then passed by the processor 66 to the input/output ports 70. The input/output ports 70 subsequently transmit the output to the actuators 74 via as actuator positioning commands. In reference to the active outside rear view system 12, the control module 64 selectively commands the aerodynamic enclosure 50 to move between the at least first and second positions P1 and P2.

The programmatic logic of the control module 64 includes at least a first mode and a second mode, the first mode being a passive mode, and the second mode being an active mode. In the passive mode, the control module 64 receives an operator command from a vehicle operator or from an on-board system of the vehicle 10 to set the active outside rear view system 12 in either the first or the second mode. Specifically, in the first mode, the operator command sets an operator-desired or determined position for the aerodynamic enclosure 50. The operator command may be generated on a human-machine interface of the vehicle, such as an infotainment screen, a pneumatic, hydraulic, mechanical or electrical switch, a mobile device in communication with the control module 64, or the like. The control module 64 then transmits the operator command to an actuator 74 of the active outside rear view system 12 via the input/output ports 70 as a passive positioning command. The passive positioning command is then executed by the actuator 74 to achieve the desired position of the aerodynamic enclosure 50.

By contrast, in the active mode, the control module 64 continuously monitors vehicle state parameters by continuously receiving data via the input/output ports 70, from vehicle state sensors 72. The control module 64 takes the vehicle state information or data as input to a second programmatic control logic stored in the memory 68 and executed by the processor 66. The processor 66 then automatically, actively and continuously, selectively, or periodically transmits active positioning commands to the actuator 74 to continuously adjust the position of the aerodynamic enclosure 50.

To alter the position of the aerodynamic enclosure 50 in either the passive or the active modes, or any other modes, the actuator 74 acts on one or more linkages 82. Specifically, the aerodynamic enclosure 50 is movably attached to the support structure 36 by one or more linkages 82. The linkage or linkages 82 may take a variety of forms including, but not limited to: gimbles, ball mounts, multi-bar linkages, or the like without departing from the scope or intent of the present disclosure. Accordingly, the linkage 82 shown in FIGS. 2A and 2B should be understood to be one of many possible linkage 82 types, and the linkage 82 as shown should not be regarded as limiting the scope or intent of the present disclosure.

In the example of FIGS. 2A and 2B, the linkage 82 is in the form of a four bar linkage 82 having a first bar 84 rotatably attached to the support structure 36 at a first pivot 86 located at a first bar first end 88. The first bar 84 is also rotatably attached to a second bar 90 at a second pivot 92 located at a first bar second end 94 such that the first bar second end 94 is distal to the first bar first end 88. The second bar 90 is rigidly affixed to the aerodynamic enclosure 50. In some examples, the second bar 90 is formed unitarily with the aerodynamic enclosure 50, while in other examples, the second bar 90 may be rigidly attached to the aerodynamic enclosure 50 by known means such as mechanical fasteners, e.g. bolts, nuts, screws, press-fit connections, interference connections, and the like, and/or chemical means such as glue, epoxy, and/or thermal means, such as plastic or metal welding, braising, or the like. The second bar 90 extends at least from the second pivot 92 to a third pivot 96 located distal along the second bar 90 to the second pivot 92. At the third pivot 96 the second bar 90 is rotatably attached to a third bar 98. The third bar 98 extends from the third pivot 96 located at a third bar first end 100 to a fourth pivot 102 disposed at a third bar second end 104. At the fourth pivot 102, the third bar 98 is rotatably attached to the support structure 36. The support structure 36 itself stands in the place of and functions as the fourth bar of the four-bar linkage 82 shown. In the example shown in FIGS. 2A and 2B, the fourth pivot 102 is disposed at a different location on the support structure 36 than the first pivot 86, however, it should be appreciated that with other forms linkages 82, some or all of the first, second, third, and fourth pivots 86, 92, 96, 102 may be co-located, and additional pivots or fewer pivots may be used without departing from the scope or intent of the present disclosure. Likewise, it should be appreciated that various other types of linkages 82 may be used without departing from the scope or intent of the present disclosure. In several examples, the linkage 82 may be one or more of a ball and socket, a scissor linkage, a four bar linkage, a three bar linkage, a two bar linkage, a crank and slider linkage, a crank and piston, a rack and pinion, a recirculating ball system, and/or a pneumatic or hydraulic piston.

The actuator 74 engages with the linkage 82 and selectively manipulates the linkage 82 to move the aerodynamic enclosure 50 between at least the first position P1 and the second position P2 different from the first position P1. That is, the control module 64, via the actuator 74, actively and/or passively alters a position of the aerodynamic enclosure 50 between at least the first position P1 and the second position P2 to achieve predetermined aerodynamic characteristics for the active rear view device system 12.

Specifically, the actuator 74 selectively moves the aerodynamic enclosure 50 independently from the support structure 36 and the rear view device 14. The actuator 74 may be any of a wide variety of motivating means for the linkage 82, including but not limited to: electromechanical devices and systems, a hydraulic devices and systems, pneumatic devices and systems, aero-elastic devices and systems, and shape-memory devices and systems. In an aero-elastic example, a spring (not specifically shown) may be attached to the linkage 82 such that the spring biases the aerodynamic enclosure 50 towards the first position P1, but as a pressure of air incident upon the aerodynamic enclosure 50 increases, the spring force of the spring is overcome at a predetermined air pressure, at which point the aerodynamic enclosure 50 moves towards or into the second position P2. In an example of an electromechanically motivated active outside rear view system 12, an electrical motor 106 is affixed to the structural support 36. The electrical motor 106 is commanded by the control module 64 to alter a position of the aerodynamic enclosure 50 based on driver input, or other active or passive positioning commands. The electrical motor 106 shown in FIGS. 2A and 2B is disposed at and acts as the first pivot 86. However, other orientations and locations for the actuator 74 generally, and the electrical motor 106 specifically, may be used without departing from the scope or intent of the present disclosure. In some examples, multiple actuators 74 may be incorporated into the active outside rear view system 12 to provide movement to the aerodynamic enclosure 50 in multiple planes, axes, or the like without departing from the scope or intent of the present disclosure.

In either the active, the passive, or any other modes, the active outside rear view system 12 alters the position of the aerodynamic enclosure 50 to achieve predetermined aerodynamic characteristics, such that in the first position P1, the aerodynamic enclosure 50 is positioned to generate a predetermined minimum quantity of aerodynamic drag, and in the second position P2, the aerodynamic enclosure 50 is positioned to generate a predetermined maximum quantity of aerodynamic downforce. Movement between the first and second positions P1, P2 may be achieved by altering an angle of attack, a horizontal, vertical, or inward/outward orientation of the aerodynamic enclosure 50, or any combination thereof. In some examples, the actuator 74 engages with the linkage 82 to tilt or rotate a forward or forward or frontward-facing portion 56 of the aerodynamic enclosure 50 about a horizontal axis "H" extending substantially laterally outward from the exterior surface 16 of the vehicle 10 so that the frontward-facing portion 56 of the aerodynamic enclosure 50 rotates or otherwise moves vertically between the first position P1 and the second position P2. In a second example, the actuator 74 engages with the linkage 82 to rotate the forward or frontward-facing portion 56 of the aerodynamic enclosure 50 about a vertical axis "V" so that the frontward-facing portion 56 rotates or otherwise moves in a substantially horizontal plane "HP" between the first position P1 and the second position P2. In a third example, the actuator 74 engages with the linkage 82 to move the forward or frontward-facing portion 56 of the aerodynamic enclosure 50 along the horizontal axis "H" extending substantially laterally outward form the exterior surface 16. In the third example, the frontward-facing portion 56 of the aerodynamic enclosure 50 moves between the first position P1 proximate the exterior surface 16 of the vehicle 10 to the second position P2 where the aerodynamic enclosure 50 is displaced axially distally or away from the exterior surface 16 of the vehicle 10 along the support structure 36.

Figure 5:
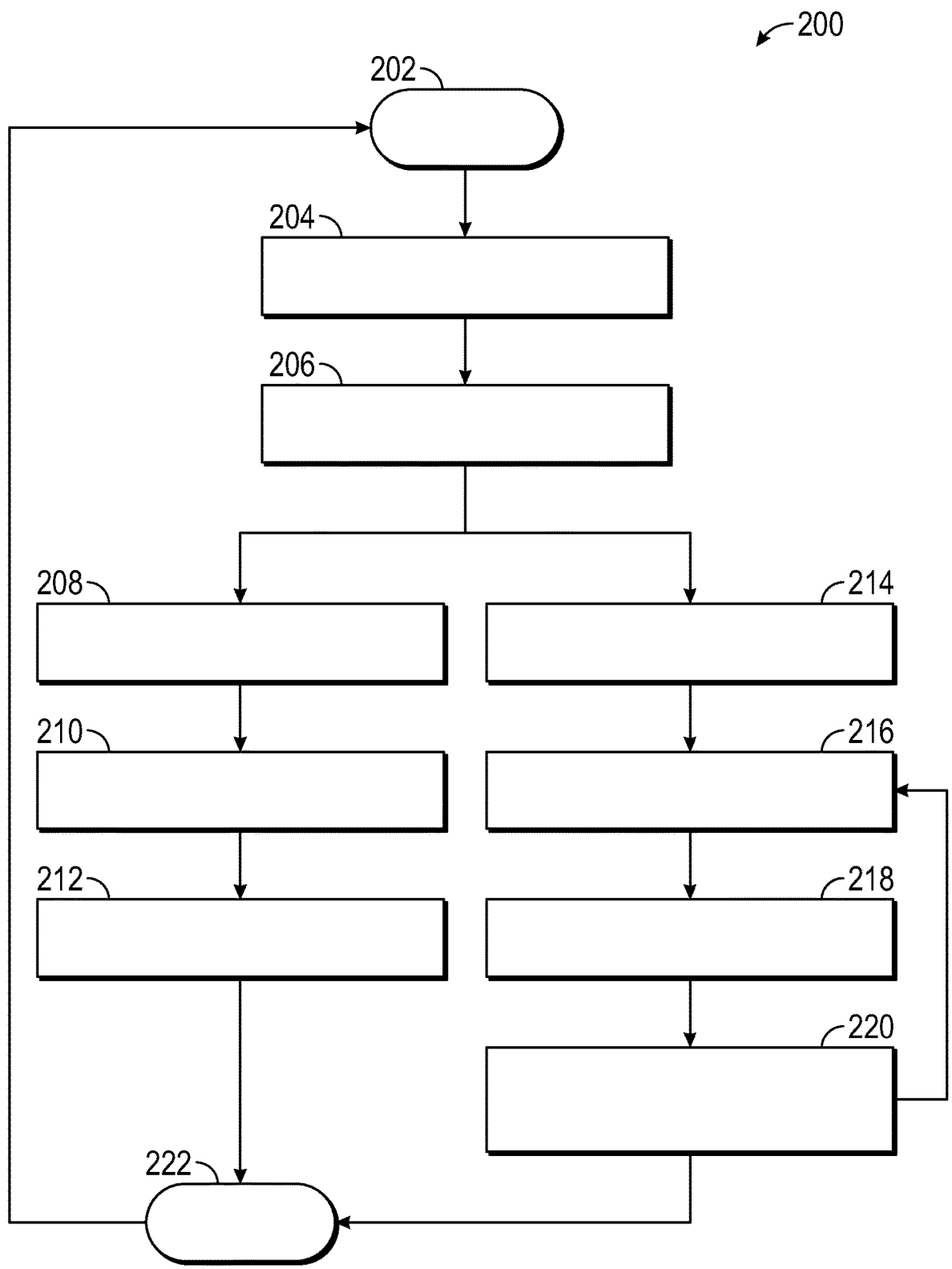
FIG. 5 is a flowchart depicting a method for adjusting a position of an active outside rear view device and system according to an exemplary embodiment.

Turning now to FIG. 5 a method 200 for adjusting a position of an active outside rear view device 14 is shown. The method 200 begins at block 202 where the active outside rear view system 12 accesses and utilizes the control module 64 to adjust the position of the aerodynamic enclosure 50 of the active outside rear view device 14. The control module 64 stores programmatic control logic within the memory 68. At block 204 the input/output ports 70 receive data. The data is transmitted to the input/output ports 70 from the actuator 74 and/or one or more sensors 72 such as vehicle state sensors and/or from one or more operator input devices, such as an HMI. The input/output ports 70, the sensors 72, the actuator or actuators 74, and the HMI are in communication with one another. At block 206, the active outside rear view system 12 receives an operator command from the HMI, the operator command selecting the first, or the second mode. At block 208, when the operator selects the passive mode, the control module 64 selectively executes the first programmatic control logic engaging the passive mode of the active outside rear view system 12. Specifically, at block 210, the control module 64 receives a secondary command from the operator. The secondary command sets a desired position for the aerodynamic enclosure 50. At block 212, the control module 64 transmits the secondary command as a passive positioning command to the actuator 74 via the input/output ports 70. The passive positioning command causes the actuator 74 to move the aerodynamic enclosure 50 to either the first position P1, the second position P2, or any positions therebetween. If, at block 206, the operator selects the second, or active mode, the method 200 proceeds to block 214 where the control module 64 selectively executes the second programmatic control logic. At block 216, the second programmatic control logic causes the control module 64 to continuously and actively monitor vehicle state parameters by continuously and actively receiving vehicle state data from speed sensors, vehicle yaw rate sensors, vehicle acceleration rate sensors, steering wheel angle sensors 76, throttle and accelerator pedal position sensors 80, brake pedal position sensors, and drive mode selection information. At block 218, the control module 64 takes the vehicle state parameters or data as input to the second programmatic control logic. In response to the input, at block 220, the control module 64 continuously transmits, via the input/output ports 70, active positioning commands to the actuator 74. The active positioning commands cause the actuator 74 to actively, continuously, and automatically move the aerodynamic enclosure 50 to either the first position P1, the second position P2, or any position therebetween. From block 220, when the system 12 is engaged in the active mode, the method 200 returns to block 216 where the control module 64 continuously and actively monitors the vehicle state parameters once more. When the passive mode is engaged, from block 212, the method proceeds to block 222 where the method 200 ends and returns back to block 202 to begin again.

In a particular example, when a driver of the vehicle engages the active mode, the system 12 engages the actuators 74 to move the aerodynamic enclosures 50 of the vehicle into the second position P2, to maximize aerodynamic downforce and vehicle 10 traction during a maximum acceleration launch from rest. Once the vehicle 10 has begun moving at a speed at which a quantity of torque or power generated by the vehicle's 10 engine (not shown) is unlikely to overcome the grip of the vehicle's 10 tires 108, the system 12 engages commands the actuators 74 to move the aerodynamic enclosures 50 to the first position P1, thereby minimizing aerodynamic drag. The transition to first position P1 increases the aerodynamic efficiency of the vehicle 10 and increases the maximum possible velocity and maximum non-traction-limited acceleration of the vehicle 10. Upon arriving at a corner in a road surface, the driver may then input a steering input to the front wheels 110 of the vehicle 10. The steering input alters the angle of the front wheels 110 as well as a steering wheel 112 angle. The steering wheel angle sensor 76 may then pass steering wheel 112 angle information to the control module 64, and based on the steering wheel 112 angle information, the control module 64 will selectively engage the second position P2 (or any position between the first and second positions P1, P2) once more. The increased aerodynamic downforce of the second position P2 has the add-on benefit of increasing mechanical grip of the wheels 110 on the road surface. Thus, cornering speeds of the vehicle 10 are increased by increasing aerodynamic downforce of the vehicle 10. Upon reaching a straight section of road, the driver may once again straighten the steering wheel 112, and the control module 64 will once again engage the actuators 74 to move the aerodynamic enclosures 50 back to the first position P1 to allow for increased aerodynamic efficiency and lower drag once more.

The first position P1 may also be automatically or manually engaged in other circumstances as well. For example, the low-drag or high aerodynamic efficiency of the first position P1 of the system 12 reduces vehicle fuel and/or electricity consumption, reduces or substantially eliminates wind-noise and other noise, vibration, and harshness (NVH) characteristics, and the like. Likewise, the high downforce characteristics of the second position P2 of the system 12 offer several advantages including, but not limited to: improving or augmenting mechanical grip during rapid vehicle acceleration/deceleration and cornering maneuvers, improving or augmenting airflow through cooling apparatuses of the vehicle 10, and the like. Moreover, the active mode of the system 12 offers substantial advantages including the ability to maintain or improve all of the above-referenced characteristics (improving fuel consumption, wind noise, NVH, increasing downforce, grip, and the like) without permanently compromising on any of those characteristics.

More generally, utilizing varying positions of the active outside rear view system 12 and aerodynamic enclosures 50, the system 12 improves, augments, or otherwise directs airflow towards, away from, and around physical attributes of the vehicle 10. While in the foregoing, reference has been made to directing airflow through cooling apparatuses of the vehicle 10 in the second position P2, it should be appreciated that airflow may be directed likewise in the first position P1, the second position P2, or any position therebetween without departing from the scope or intent of the present disclosure. The airflow directed to, around, and over specific areas of the vehicle 10 by the aerodynamic enclosures 50 in the first and second positions P1, P2, may be used for altering aerodynamic drag characteristics, downforce or lift characteristics, thermal management purposes, and for altering or tuning wind noise and NVH characteristics of the vehicle 10.

The active outside rear view system 12 and method 200 of the present disclosure offer numerous advantages including: reducing vehicle fuel and/or electricity consumption, reducing or substantially eliminating wind-noise and other noise, vibration, and harshness (NVH) characteristics, and the like in the first position P1. Improving or augmenting mechanical grip during rapid vehicle acceleration/deceleration and cornering maneuvers in the second position P2, and selectively improving or augmenting airflow through cooling apparatuses of the vehicle 10, and the like by actively and selectively managing airflow over the exterior surface 16 of the vehicle 10 by altering the position of the aerodynamic enclosures 50 between the first and second positions P1, P2.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An active outside rear view system for a vehicle, the system comprising:
    a support structure mounted to an exterior surface of the vehicle;
    a rear view device movably affixed to the support structure;
    a linkage extending from a first end to a second end, wherein the first end of the linkage is movably affixed to an aerodynamic enclosure and the second end of the linkage is movably affixed to the support structure; and
    an actuator engaged with the linkage and moving the aerodynamic enclosure between at least a first position and a second position different from the first position, wherein the aerodynamic enclosure is independently movable relative to the rear view device and the support structure, wherein aerodynamic characteristics of the active outside rear view system are different in each of the first position and the second position of the aerodynamic enclosure;
    a control module, the control module in communication with the actuator and selectively moving the aerodynamic enclosure between the at least first and second positions, wherein the control module comprises:
    a processor, a memory, and one or more input/output ports, the memory storing programmatic control logic, the input/output ports receiving data from the actuator and passing the data to the processor, the processor taking the data as an input and executing the programmatic control logic, the processor passing actuator positioning commands to the input/output ports, and the input/output ports transmitting the actuator positioning commands to the actuator, wherein the programmatic control logic further comprises:
    a first programmatic control logic engaging a first mode of the active outside rear view device, and a second programmatic control logic engaging a second mode of the active outside rear view device;
    the first mode being a passive mode, wherein the control module receives a command from a vehicle operator, the command setting a desired position for the aerodynamic enclosure, and the control module transmits a passive positioning command to the actuator to achieve the desired position; and
    the second mode being an active mode, wherein the control module continuously monitors vehicle state parameters by continuously receiving data via the input/output ports, from vehicle state sensors comprising: speed sensors, vehicle yaw rate sensors, vehicle acceleration rate sensors, steering wheel angle sensors, throttle position sensors, accelerator pedal position sensors, brake pedal position sensors, and drive mode selection status data, and wherein the control module takes the data as input to a second programmatic control logic that, when executed by the processor, continuously transmits active positioning commands to the actuator to continuously and automatically adjust the position of the aerodynamic enclosure.

2. The active outside rear view system of claim 1 wherein in the first position, the aerodynamic enclosure is positioned to generate a predetermined minimum quantity of aerodynamic drag, and in the second position, the aerodynamic enclosure is positioned to generate a predetermined maximum quantity of aerodynamic downforce.

3. The active outside rear view system of claim 1 wherein the actuator comprises one or more of an electromechanical device, a hydraulic device, a pneumatic device, an aeroelastic device, and a shape-memory device, and wherein the linkage comprises one or more of a ball and socket, a scissor linkage, a four bar linkage, a two bar linkage, a crank and slider linkage, a crank and piston, a rack and pinion, a recirculating ball system, and a pneumatic or hydraulic piston.

4. The active outside rear view system of claim 1 wherein the actuator engages with the linkage to tilt a frontward-facing portion of the aerodynamic enclosure about a horizontal axis extending substantially laterally outward from the exterior surface of the vehicle so that the frontward-facing portion of the aerodynamic enclosure moves vertically between the first position and the second position.

5. The active outside rear view system of claim 1 wherein the actuator engages with the linkage to rotate a frontward-facing portion of the aerodynamic enclosure about a vertical axis so that the frontward-facing portion of the aerodynamic enclosure moves in a substantially horizontal plane between the first position and the second position.

6. The active outside rear view system of claim 1 wherein the actuator engages with the linkage to move a frontward-facing portion of the aerodynamic enclosure along a horizontal axis extending substantially laterally outward from the exterior surface of the vehicle so that the frontward-facing portion of the aerodynamic enclosure moves laterally between the first position proximate the exterior surface of the vehicle and the second position distal to the exterior surface of the vehicle.

7. The active outside rear view system of claim 1 wherein the rear view device comprises one or more of a sensor, a camera, and an optical mirror.

8. A method for adjusting a position of an active outside rear view system for a vehicle, the method comprising:
    utilizing a control module to adjust the position of the active outside rear view system;
    storing programmatic control logic within a memory of the control module;
    receiving, by input/output ports of the control module, a mode selection input, the mode selection input engaging a first programmatic control logic, or a second programmatic control logic, the first programmatic control logic engaging a first mode of the active outside rear view device, and the second programmatic control logic engaging a second mode of the active outside rear view system;
    receiving, by the input/output ports of the control module, data transmitted from an actuator of the active outside rear view system in communication with the input/output ports, the active outside rear view system further including:
        a support structure mounted to an exterior surface of the vehicle;
        a rear view device movably affixed to the support structure, the rear view device including one or more of a sensor, a camera, and an optical mirror;

an aerodynamic enclosure;
a linkage extending from a first end to a second end, wherein the first end of the linkage is movably affixed to the aerodynamic enclosure and the second end of the linkage is movably affixed to the support structure; and
an actuator engaged with the linkage and moving the aerodynamic enclosure between at least a first position and a second position different from the first position, wherein the aerodynamic enclosure is independently movable relative to the rear view device and the support structure;
passing the data from the input/output ports to a processor of the control module, the processor receiving the data as input;
executing, with the processor, the programmatic control logic to generate actuator positioning commands as output;
passing the actuator positioning commands to the input/output ports;
transmitting the actuator positioning commands to the actuator; and
selectively adjusting the aerodynamic enclosure between at least the first position and the second position based on the actuator positioning commands, wherein aerodynamic characteristics of the active outside rear view system are different in each of the first position and the second position of the aerodynamic enclosure.

9. The method of claim 8 further comprising:
selectively executing the first programmatic control logic to engage the first mode of the active outside rear view system, the first programmatic control logic including:
receiving, by the control module, a command from a vehicle operator;
setting, by the control module, a desired position for the aerodynamic enclosure based on the command from the vehicle operator; and
transmitting, from the control module to the actuator via the input/output ports, a passive positioning command to the actuator to achieve the desired position.

10. The method of claim 8 further comprising:
selectively executing the second programmatic control logic to engage the second mode of the active outside rear view system, the second programmatic control logic including:
continuously monitoring vehicle state parameters by continuously receiving vehicle state data via the input/output ports, from vehicle state sensors comprising: speed sensors, vehicle yaw rate sensors, vehicle acceleration rate sensors, steering wheel angle sensors, throttle position sensors, accelerator pedal position sensors, brake pedal position sensors, and drive mode selection status data;
taking the vehicle state data as input; and
in response to the input, continuously transmitting, by the control module via the input/output ports, active positioning commands to the actuator to continuously and automatically adjust a position of the aerodynamic enclosure.

11. The method of claim 8 further comprising:
positioning the aerodynamic enclosure to generate a predetermined minimum quantity of aerodynamic drag in the first position; and
positioning the aerodynamic enclosure to generate a predetermined maximum quantity of aerodynamic downforce in the second position.

12. The method of claim 8 wherein selectively adjusting the aerodynamic enclosure between at least the first position and the second position further comprises:
commanding the actuator to move between at least the first position and the second position, wherein the actuator includes one or more of an electromechanical device, a hydraulic device, a pneumatic device, an aero-elastic device, and a shape-memory device, and
wherein the linkage includes one or more of a ball and socket, a scissor linkage, a four bar linkage, a two bar linkage, a crank and slider linkage, a crank and piston, a rack and pinion, a recirculating ball system, and a pneumatic or hydraulic piston.

13. The method of claim 8 further comprising:
moving, with the actuator via the linkage, a frontward-facing portion of the aerodynamic enclosure about a horizontal axis extending substantially laterally outward from the exterior surface of the vehicle so that the frontward-facing portion of the aerodynamic enclosure moves vertically between the first position and the second position.

14. The method of claim 8 further comprising:
moving, with the actuator via the linkage, a frontward-facing portion of the aerodynamic enclosure about a vertical axis so that the frontward-facing portion of the aerodynamic enclosure rotates in a substantially horizontal plane between the first position and the second position.

15. The method of claim 8 further comprising:
moving, with the actuator via the linkage, a frontward-facing portion of the aerodynamic enclosure along a horizontal axis extending substantially laterally outward from the exterior surface of the vehicle so that the frontward-facing portion of the aerodynamic enclosure slides laterally between the first position proximate the exterior surface of the vehicle and the second position distal to the exterior surface of the vehicle.

16. An active outside rear view system for a vehicle comprising:
a support structure mounted to an exterior surface of the vehicle;
a rear view sensor, camera, or optical mirror movably affixed to the support structure;
a linkage extending from a first end to a second end, wherein the first end of the linkage is movably affixed to a forward-facing aerodynamic enclosure, and the second end of the linkage is movably affixed to the support structure opposite the rear view sensor, camera, or optical mirror;
an actuator engaged with the linkage and moving the aerodynamic enclosure between at least a first position and a second position different from the first position, the actuator including one or more of an electromechanical device, a hydraulic device, a pneumatic device, an aero-elastic device, and a shape-memory device, and
wherein in the first position, the aerodynamic enclosure is positioned to generate a predetermined minimum quantity of aerodynamic drag, and in the second position the aerodynamic enclosure is positioned to generate a predetermined maximum quantity of aerodynamic downforce, wherein the aerodynamic enclosure is independently movable relative to the rear view sensor, camera, or optical mirror and the support structure.

17. The active outside rear view system for a vehicle of claim 16, wherein, the actuator is operable in at least two modes including:

a passive mode, wherein the active outside rear view system receives a command from a vehicle operator, the command setting a desired position for the aerodynamic enclosure, and the actuator positioning the aerodynamic enclosure in the desired position; and an active mode, wherein the active outside rear view system continuously monitors vehicle state parameters from vehicle state sensors comprising: speed sensors, vehicle yaw rate sensors, vehicle acceleration rate sensors, steering wheel angle sensors, throttle position sensors, accelerator pedal position sensors, brake pedal position sensors, and drive mode selection status data, and wherein the active outside rear view system continuously, automatically, and actively moves the actuator to continuously, automatically, and actively adjust the position of the aerodynamic enclosure, wherein aerodynamic characteristics of the active outside rear view system are different in each of the first position and the second position of the aerodynamic enclosure.

* * * * *